Oct. 17, 1967     G. A. HALLS     3,347,471

FUEL INJECTOR

Filed June 1, 1965

Inventor
Gordon Allan Halls
By
Cushman, Darby · Cushman
Attorneys

United States Patent Office 3,347,471
Patented Oct. 17, 1967

3,347,471
FUEL INJECTOR
Gordon Allan Halls, Littleover, Derby, England, assignor to Rolls-Royce Limited, Derby, England, a British company
Filed June 1, 1965, Ser. No. 460,292
Claims priority, application Great Britain, July 31, 1964, 30,369/64
3 Claims. (Cl. 239—466)

This invention concerns a fuel injector for a gas turbine engine combustion chamber.

According to the present invention, there is provided a fuel injector for a gas turbine engine combustion chamber comprising a swirl chamber, means for supplying fuel to the swirl chamber, means for swirling the fuel in the swirl chamber, an outlet chamber which has a frusto-conical internal surface and which communicates with the swirl chamber so as to receive a swirling supply of fuel therefrom, a peripheral cowling extending downstream of and supported by the downstream end of the outlet chamber and means defining therein a plurality of angularly spaced apart apertures through which the swirling fuel may pass out of the injector, whereby fuel passing through the outlet chamber to the said apertures washes over the whole internal surface of the outlet chamber to tend to prevent the formation of carbon deposits thereon.

The apertures may be radially aligned. Alternatively, the apertures may be tangential to the internal surface of the outlet chamber whereby the fuel passing through the apertures tends to prevent the formation of carbon deposits therein.

The invention also comprises a combustion chamber for a gas turbine engine provided with a fuel injector as set forth above.

Additionally the invention comprises a gas turbine engine provided with such a combustion chamber.

Figure 1:
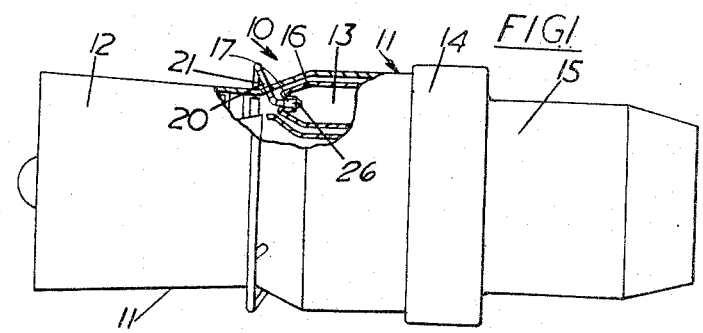
Figure 4:
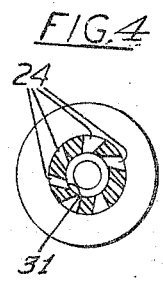
Figure 2:
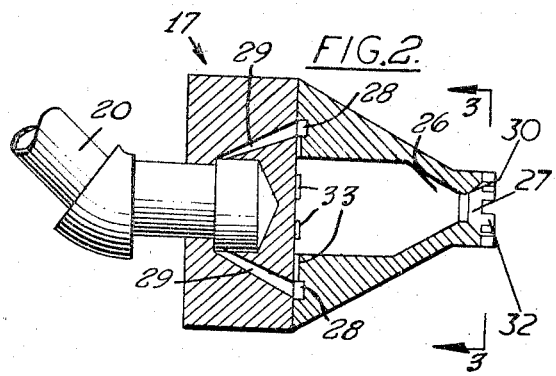
Figure 3:
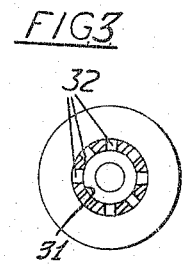

The invention is illustrated, merely by way of example, in the accompanying drawings, in which:

FIGURE 1 is a diagrammatic representation partly in section of a gas turbine engine provided with a fuel injector according to the present invention, FIGURE 2 is an enlarged fragmentary sectional view, partly in elevation, of the fuel injector shown in FIGURE 1, FIGURE 3 is a section on the line 3—3 of FIGURE 2, FIGURE 4 is a sectional view similar to FIGURE 3 but showing a modified form of apertures for the fuel injector of the present invention.

In FIGURE 1 there is shown a gas turbine engine 10 having an engine casing 11 in which there are arranged in flow series a compressor 12, combustion equipment 13, and a turbine 14, the turbine exhaust gases being directed to atmosphere through a jet pipe 15.

The combustion equipment 13 comprises a plurality of angularly spaced apart flame tubes 16 (only one shown) each of which is provided with a fuel injector 17. Each of the fuel injectors 17 has a swirl chamber 26 which is provided with means described below for swirling the fuel therein, the swirl chamber 26 being arranged to receive fuel from a fuel pipe 20 extending to a fuel manifold 21. Fuel from pipe 20 passes into an annular manifold 28 through inclined passages 29, and from manifold 28 the fuel passes into the swirl chamber 26 through a series of ports 33 which are arranged tangentially to the wall of the swirl chamber 26 so as to impart swirl to the fuel flowing therethrough.

Each of the fuel injectors 17 also has an outlet chamber 27 which communicates with the swirl chamber 26 so as to receive a swirling supply of fuel therefrom.

The outlet chamber 27 has a frusto-conical internal surface 30 and a peripheral wall or cowling 31 whose downstream end is provided with a plurality of angularly spaced apart radially extended apertures 32 through which the swirling fuel may pass out of the injector 17.

As will be seen from FIGURE 4, there is disclosed a modification of the fuel injector of the present invention wherein the downstream end of the peripheral wall 31 is provided with apertures 24 which are tangential to the internal surface 31 of the outlet chamber 27, whereby the fuel passing through the apertures 24 washes therethrough in such a way as to tend to prevent the formation of carbon deposits therein.

As will be appreciated, the frusto-concial shape of the internal surface 30 is such that fuel passing through the outlet chamber 27 to the apertures 32 or 24 as the case may be washes over the whole internal surface 30 whereby to tend to prevent the formation of carbon deposits thereon.

A fuel injector according to the present invention may, thus have a frusto-conical internal surface 30 provided both with tangentially arranged apertures 24 and radially arranged apertures 32.

I claim:
1. A fuel injector for a gas turbine engine combustion chamber comprising a swirl chamber, means for supplying fuel to the swirl chamber, means for swirling the fuel in the swirl chamber, an outlet chamber which has a frusto-conical internal surface diverging in a downstream direction and which communicates with the swirl chamber so as to receive a swirling supply of fuel therefrom, a peripheral cowling extending downstream of and supported by the downstream end of the outlet chamber and means defining therein a plurality of angularly spaced apart apertures through which the swirling fuel may pass out of the injector, whereby fuel passing through the outlet chamber to the said apertures washes over the whole internal surface of the outlet chamber to tend to prevent the formation of carbon deposits thereon.

2. A fuel injector as claimed in claim 1 wherein said apertures are radially extending apertures through which the swirling fuel washing over the frusto-conical internal surface of the outlet chamber may pass out of the injector.

3. A fuel injector as claimed in claim 1 wherein said apertures are tangential to said internal surface of the outlet chamber whereby the fuel passing through the apertures tends to prevent the formation of carbon deposits therein.

References Cited

UNITED STATES PATENTS

| 2,075,589 | 3/1937 | Munz | 239—460 |
| 2,554,409 | 5/1951 | Holder | 239—460 |
| 2,914,257 | 11/1959 | Wiant | 239—460 |
| 3,039,701 | 6/1962 | Carlisle | 239—463 |

EVERETT W. KIRBY, *Primary Examiner.*